Nov. 8, 1960     E. J. DOWER     2,959,735
ELECTRIC TACHOMETER
Filed Sept. 24, 1956
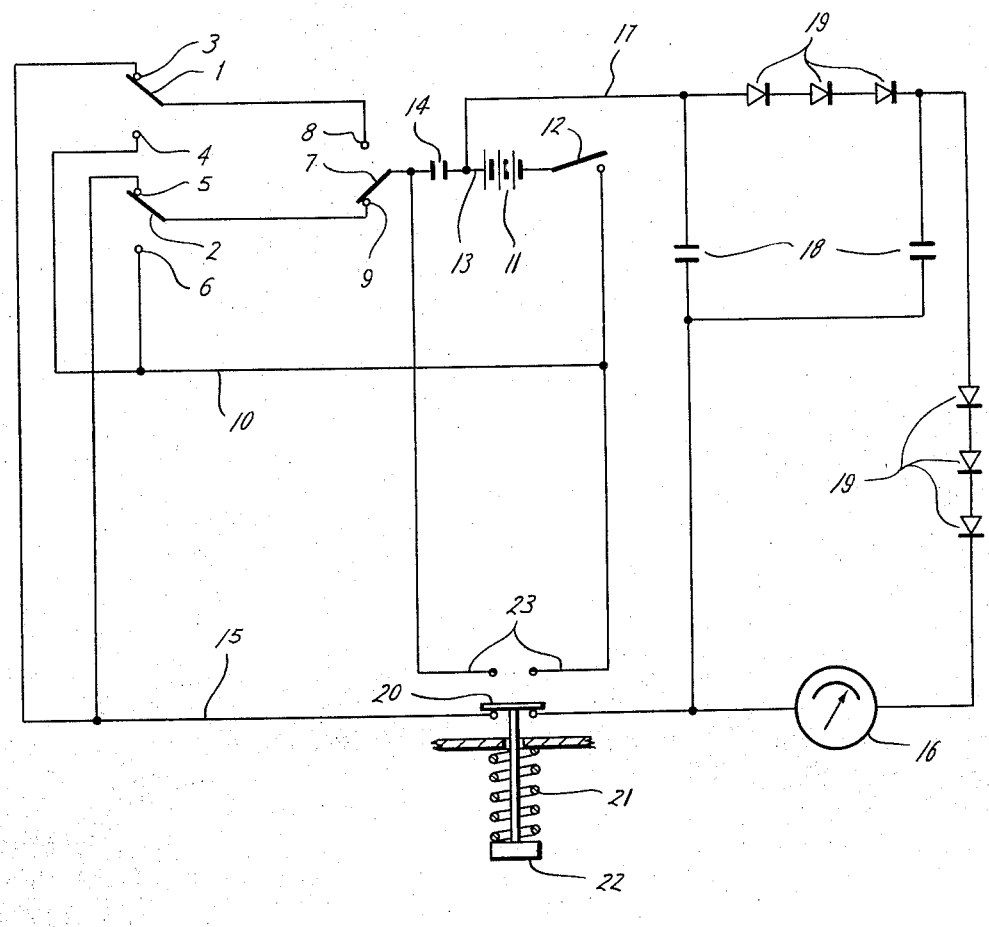
E. J. Dower
INVENTOR.
BY
G C Helmig
ATTORNEY

United States Patent Office 2,959,735
Patented Nov. 8, 1960

2,959,735

ELECTRIC TACHOMETER

Ethell J. Dower, Houston, Tex., assignor to Well Logging Equipment Manufacturing Company, Houston, Tex., a corporation of Texas Filed Sept. 24, 1956, Ser. No. 611,478

9 Claims. (Cl. 324—70)

This invention relates to speed indicators and more particularly to an improved electric tachometer system for counting repetitive cycles of rotary, reciprocatory or other recurring motion. It can be made up into a portable, light weight, compact assembly of standard parts co-operatively arranged in a circuit for giving a stable indication of a selected range of cycles per time unit with minimum indicator fluctuation between successive cycles, minimum time lag during changes in velocity rate, and a linear response to the cycle rate.

The invention may be applied for measuring various types of repetitive mechanical motion and is ideally suited for and has been particularly designed for indicating the instant rate of reciprocation of a pump piston whose operating range is of relatively low frequency and on the order of from zero to one hundred strokes per minute. The above mentioned advantages are accomplished by only one operation of a switch for each cycle or pump stroke. With each actuation of the switch, a capacitor first receives an electric charge which then is discharged and registered by a meter whose measuring circuit is of relatively large capacity to receive the surge and store substantially the complete discharge or to permit the current to be spread or distributed in the circuit so that only a small residue of the initial charge is left in the capacitor, which, therefore, is conditioned to receive a substantially equal charge on each successive actuation of the switch. The measuring circuit also contains a type of resistance having the inherent characteristic of being differently resistant to forward applied voltage between the extremes of the working voltage range.

The higher the applied voltage builds up with increased stroke frequency, the less will be the resistance to current flow to the meter and the lesser the frequency of switch actuation and voltage build-up, the greater will be the flow resistance. The variable rate of bleed-off through the resistance to the meter throughout the working range is related to the voltage build-up and current flow at any given voltage is spread somewhat uniformly throughout the interval between succeeding charges, and whatever the pump stroke frequency, is steady through the indicator, and the metered current for any time period approaches that of the charges being intermittently impressed on the circuit. Thus control of current flow at the indicator is an automatic response to voltage level, and regardless of pump stroke frequency, the meter continuously registers substantially constant current flow between successive discharges of the capacitor with minimum fluctuation in the reading at any given frequency and the indicator quickly follows change in frequency and even abrupt changes without much time lag.

The accompanying drawing illustrates a simple circuit with the components connected for application to an installation of a pair of mud pumps commonly employed for well drilling purposes. The pumps are for alternate operation and one is a stand-by for the other. A suitable actuating switch has a spring biased and pivoted blade or arm to be positioned near one limit of the reciprocating stroke of the pump rod so as to be engaged by the rod and deflected from one contact to another at the end of the stroke in one direction and to be released on stroke reversal for movement back to the first contact under spring force.

Two such switches, one for each of a pair of pumps, are shown in the drawing at 1 and 2 in their spring biased positions. The switch blade 1 alternately closes with contacts 3 and 4, and the switch blade 2 will engage either of the contacts 5 and 6. A selector switch 7 can be thrown between and engage either of two contacts 8 and 9 in series respectively with the switches 1 and 2, depending on which pump is in operation.

The contacts 4 and 6 of the two actuator switches have a common conductor 10 joining them to the negative terminal of a battery 11 when the master switch 12 is closed. A line 13 joins the positive terminal of the battery 11 with one plate of a condenser or metering capacitor 14 whose other plate is connected to the switch blade 7. Thus the condenser 14 can be charged once in each pump operating cycle as the selected actuator switch is thrown momentarily to close the condenser-battery portion of the circuit.

The contacts 3 and 5 of the two actuator switches are joined by a conductor 15 to one side of an indicator 16 whose other side is connected through a line 17 with one plate of the condenser 14, the other condenser plate being connected through the selector switch 7 and switches 1 and 2 with one or the other of the contacts 3 and 5 to complete the measuring portion of the circuit and for discharging the condenser 14. Measuring circuit capacity is increased by incorporating one or more condensers 18 across the indicator connecting lines 17 and 15, and resistance in the lead-in line 17 to the indicator 16 is placed ahead of the indicator and beyond the capacitors or condensers 18. The diagram illustrates the use of two condensers 18 and a set of three resistor elements in series tandem relation beyond each condenser 18. Specifically, the resistor elements contemplated for use are germanium crystal diodes 19 which, as distinguished from standard fixed resistors, offer increasingly greater impedance as applied forward voltage decreases. Resistance increase is most pronounced in the lower part of the applied forward voltage range. Advantage has been taken of that characteristic for obtaining improved readings in the operation of the tachometer circuit described.

In the operation of the pump stroke counter and with the master switch 12 closed and the selector switch blade 7 set on contact 9 as shown in the drawing, the switch blade 2 in each cycle of the pump with which it is associated, will make and break engagement alternately with the contacts 6 and 5 once in each succeeding cycle throughout the pump speed range. Whenever the metering circuit containing the switch contact 5 is open and the circuit containing the switch contact 6 is closed, then the opposite terminals of the battery 11 are joined to opposite sides of the condenser 14 for charging the same. This battery containing circuit is broken as pump operation shifts the switch blade 2 away from the contact 6 and then into engagement with the contact 5 to place the previously charged condenser 14 in circuit with the condensers 18, the diodes 19 and the indicator 16. Continued pump operation shifts the stroke switch blade 2 away from the contact 5 and back toward the contact 6 for a repetition of the action in the next cycle. According to the present invention and for reasons to be explained, current flow recorded at the indicator 16 is a measure of pump speed rate and changes promptly in response to rate change. In like manner, co-action of the stroke switch 1 with the contacts 4 and 3 for sequentially charging and discharging the condenser 14 is obtained by adjustment of the selector switch 7 to close the contact 8.

In a practical embodiment of the improved circuit there has been employed a microampere meter whose needle or indicator arm traverses a scale graduated in cycles or strokes per minute and/or several scale markings in gallons per minute for pumps of known capacity. For a linear scale and accuracy, the first requirement is that the capacitor 14 receive an equal charge in coulombs each time the switch is actuated, regardless of actuation rate. Using a zero to one hundred microampere meter without wasting or shunting current around it, the metering capacitor 14 must receive sixty microamperes seconds charge in order that each microampere scale increment on the meter is representative of one cycle per minute. When the supply voltage is from a 90-volt battery, the capacitor 14 must then be 0.666 microfarad in capacity, and to insure that it will receive an equal charge independently of charge frequency, it must bleed off or discharge into a large capacity in the measuring part of the circuit. This relatively large capacity, on the order of 1300 microfarads, is afforded by the capacitors 18. Accordingly, when the metering capacitor 14 is discharged into the measuring capacitors, the charge of 60 microamperes seconds stored at 90 volts is distributed throughout the capacity of 1300.666 microfarads and hence is stored at only 0.0461 volt, or approximately 50 millivolts. This means that only 0.046 percent of the initial charge is left in the metering capacitor 14, which is such a small amount as not to interfere materially with the reception of a full charge upon the succeeding cycle.

If standard fixed resistors were to be used in conjunction with the capacitors for bleed-down through the meter at an average current of one microampere for sixty seconds, or one stroke per minute, then the voltage necessary in the capacitor reservoir for a current flow of 100 microamperes would be approximately 4.6 volts. At 100 cycles per minute, the capacitor 14 could discharge from 90 volts down to 4.6 volts and the charge received and transferred each cycle by the capacitor 14 would be lessened by about five percent. A five percent linear variation at the meter would result, since the reading would be one microampere for one cycle per minute and only 95 microamperes for 100 cycles per minute. Furthermore, a voltage rise to 4.6 volts in the measuring capacitors 18 would cause considerable time lag between an actual change in cycle rate and the change in the meter indicated rate. With the instrument showing 100 cycles per minute and the measuring capacitors 18 charged to a voltage required to pass 95 microamperes indicative of 100 cycles per minute, a lapse of one minute would occur for full scale deflection, and the deflection rate would be prolonged for a lesser scale deflection to a slower speed rate because although the capacitors are being continuously bled down, they are also being built up in charge.

Instead of standard fixed resistors, the use of germanium diodes will substantially eliminate inaccuracy and erratic readings. Such units of standard design can be selected for their resistance to forward applied voltage in relation to the mentioned capacitor and charge ratings, and installed as two groups of three resistance elements each, so that the effective combined resistance of the six diodes at exemplary cycle rates will be approximately as follows:

50,000 ohms at 0.05 volt, or one cycle per minute (one microampere)

24,000 ohms at 0.24 volt, or 10 cycles per minute (10 microamperes)

16,000 ohms at 0.33 volt, or 20 cycles per minute (20 microamperes)

8,000 ohms at 0.52 volt, or 60 cycles per minute (60 microamperes)

6,500 ohms at 0.65 volt, or 100 cycles per minute (100 microamperes)

Germanium diodes having the foregoing resistance values are commercial items regularly on sale by Sylvania Electric Company and are currently listed as types 1N54A.

At 100 cycles per minute, the effective resistance requires only 0.65 volt, and that voltage can be built up in only 15 cycles, whereas if the resistance were a fixed 50,000 ohms, a build-up to approximately 5 volts would require 100 cycles. For the instrument to move from zero to 100 cycles per minute, less than thirty seconds are required with the diode circuit whereas the fixed resistance type circuit would take in excess of two minutes. Inasmuch as the voltage of the capacitors 18 has to rise to only 0.65 volt with the diode circuit, the metering capacitor 14 can discharge down to 0.65 volt at 100 cycles per minute. It follows that in each cycle at one hundred cycles per minute the charge impressed at the capacitor 14 is 90 volts minus 0.65 volt, or 89.35 volts. At one cycle per minute, the effective charge is 90 volts minus 0.05 volt, or 89.95 volts. Thus the variation between these extremes is only 0.7 percent, which in linearity compares to a five percent variation with fixed resistors.

For indicating low mechanical frequencies up to about 100 per minute, the circuit as described is much superior to available conventional circuits. It better damps the indicator needle at low frequency. The variation is only approximately a quarter cycle per minute at one cycle per minute, and readings can be made to one-half cycle per minute in any part of the linear scale. The instrument has excellent response to changes in frequency and is not overdamped in any part of the range, and responds from zero to full scale in less than one-half minute. Calibration and accuracy of the circuit are dependent on only two components aside from the indicating microammeter, and these are the metering capacitor 14 and the 90-volt battery. Small variations in resistance or capacitance of other components may have a slight effect on damping and response, but will not appreciably affect accuracy. Batteries are available on the open market which have high stability and long life and which provide constant voltage through useful life. In other words, at the end of the useful life, the battery voltage falls off sharply for an indication that replacement is required. A suitable source of direct current other than a battery can be used if convenient. Inasmuch as there are no calibrating shunts in the circuit, there is no waste of battery current, and inasmuch as full scale readings require only one-tenth milliampere, it follows that a one thousand milliampere-hour cell can operate the circuit continuously for 10,000 hours, or 460 days, at full scale and twice as long at half scale.

It will be noticed in the drawing that the conductor 15 includes a pair of spaced contacts which are bridged by a switch blade 20. This blade 20 is a part of a push button switch and is normally held in the closed position shown by a coil spring 21 exerting an outward force on the push button 22. Depression of the button 22 will open the line 15 and move the blade 20 to close a test circuit 23 which includes the battery 11 and the metering condenser 14. Manual depression and release of the button 22 will charge and discharge the condenser in simulation of recurring cycles, and observation of the indicator needle will tell whether the system is functioning properly.

What is claimed is:

1. In a cycle indicating circuit of the character described, a current flow indicator, means in circuit with the indicator and responsive to repetitive occurrences at any rate within a given variable range to impress current charges on the circuit of substantially equal charge at each occurrence, a condenser interposed between said means and the indicator and of a large capacity to store substantially all of the impressed current charges and a resistor having a variable resistance rate which changes with differences in circuit voltage and being in series circuit relation with and between the indicator and the discharge side of the condenser and whose resistance to current flow from the condenser is relatively low in the higher portion of the voltage range of stored current and is many times higher in the lower portion of the voltage range.

2. An electric tachometer circuit having therein a device responsive to variation in current flow, a variable rate cyclically operated means to impress a given charge on the circuit in each cycle, capacitance of an order to store substantially the maximum of impressed current and means in the circuit between said capacitance and said device offering changeable resistance to current flow to said device and whose current flow resistance increases and decreases in relation to voltage drop and rise, respectively.

3. In an electric tachometer system arranged to minimize indicator lag and provide approximate linear response to cycle rate, a circuit including a current flow indicator, resistance means controlling flow of current to said indicator and offering resistance which changes in inverse relation to voltage rise, a variable rate cyclically operated means to charge said circuit equally in each cycle and capacitance in the circuit capable of storing substantially all current whatever the rate of charge, said resistance means in circuit series sequence being disposed between said capacitance and said indicator.

4. In an electric tachometer system, a circuit including a current flow indicator, a metering condenser arranged to be alternately charged and discharged into the circuit and to receive substantially an equal charge in each cycle regardless of the rate of charge and discharge, a measuring condenser providing circuit capacity in relation to the capacity of said metering condenser as to enable substantially complete discharge of the latter at each discharge thereof and a germanium resistance means connected in the circuit between said metering condenser and said indicator and controlling current flow to said indicator and offering smaller resistance to high voltage current than to low voltage current, the higher resistance being many times that of the lower resistance.

5. In a variable speed indicator system, an electric circuit, means operative to impress on the circuit repetitive equal current charges at a rate variable in accord with speed cycles to be measured, said circuit including a condenser, a current flow indicator and germanium resistance means interposed between said condenser and the indicator and arranged to impede current flow through the indicator and which germanium resistance means has the inherent characteristic of offering resistance which changes in inverse relation to change in voltage and is on the order of 50,000 ohms to current flow at lower voltage of about 0.05 volt and is on the order of 6,500 ohms to current flow at higher voltage of about 0.65 volt.

6. In a variable speed indicator system, a circuit having a current flow indicator, a resistance element controlling current flow to said indicator and offering resistance which is variable in response to changes in forwardly applied voltage and in inverse relation to voltage rise and drop, speed responsive means including a condenser which in each cycle is charged with an equal charge and then discharges in said circuit, and condenser means in the circuit ahead of and in series relation with the resistance element and said indicator providing capacity for receiving substantially complete discharge of the first mentioned condenser.

7. The system of claim 6, wherein the relation of capacities of said condenser alone and of said condenser plus the circuit is in a wide ratio on the order of approximately 0.666 to 1300.666 so that discharge of the condenser into the circuit is substantially complete.

8. Means to indicate the operating speed of a mechanism, including a charging circuit having therein a current source and metering capacitance to be charged, a discharge circuit having therein said metering capacitance for the discharge thereof, a storage capacitance, an indicator and resistance means between the indicator and the storage capacitance and whose resistance changes in inverse relation to voltage rise in the discharge circuit and cyclically operated switch means whose operating cycle is timed to vary with the operating speed to be indicated and which acts in one phase of its cycle to close the charging circuit and open the discharge circuit and acts in another phase of the cycle to open the charging circuit and close the discharge circuit.

9. Means to indicate operating speed of a mechanism including a pair of contacts, movable means engageable with said contacts alternately and adapted for connection with said mechanism and movement thereby in a cycle timed to the speed of the mechanism, a current source and a metering condenser connected in circuit through one contact for imposing an equal charge on the condenser each time said movable means is engaged with said one contact, a storage capacitance, an indicator and resistance means between the storage capacitance and indicator connected in circuit with the other contact and with the metering condenser each time said movable means is engaged with said other contact, said capacitance having capacity enabling complete discharge of the metering condenser and said resistance means offering resistance varying inversely to voltage variation.

References Cited in the file of this patent

UNITED STATES PATENTS

| | | |
|---|---|---|
| 2,199,190 | Shore | Apr. 30, 1940 |
| 2,221,591 | Lansdale | Nov. 12, 1940 |
| 2,300,198 | Brown | Oct. 27, 1942 |
| 2,465,437 | Engelhardt | Mar. 29, 1949 |
| 2,473,542 | Philpott | June 21, 1949 |
| 2,586,804 | Fluke | Feb. 26, 1952 |
| 2,607,528 | McWhirter | Aug. 19, 1952 |
| 2,632,038 | Hofstadter | Mar. 17, 1953 |
| 2,762,976 | Conant | Sept. 11, 1956 |